No. 723,136. PATENTED MAR. 17, 1903.
W. P. BURKE.
CRUPPER SHIELD.
APPLICATION FILED MAR. 28, 1901.
NO MODEL.
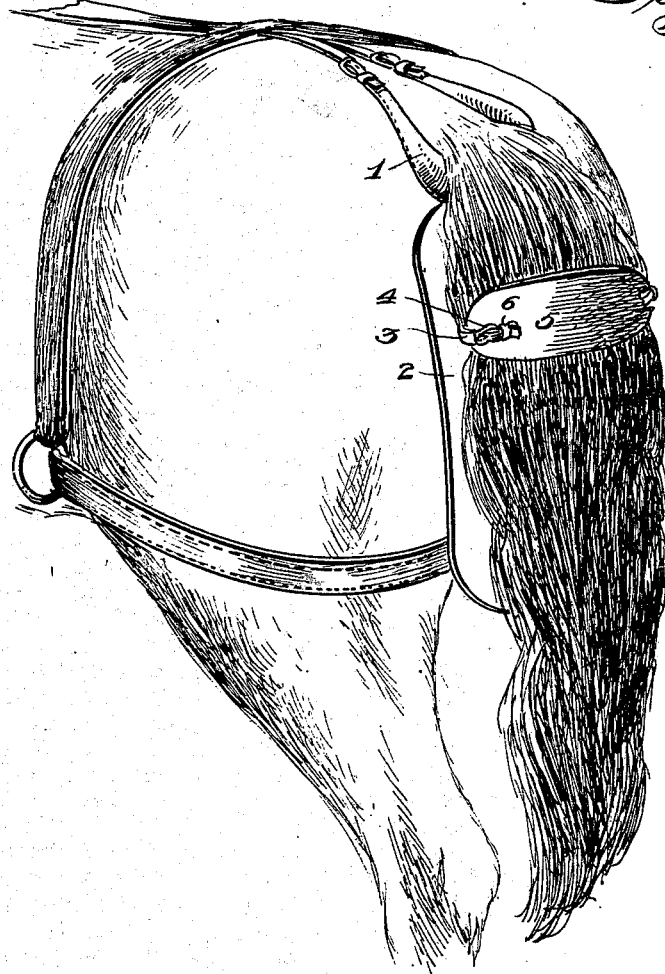
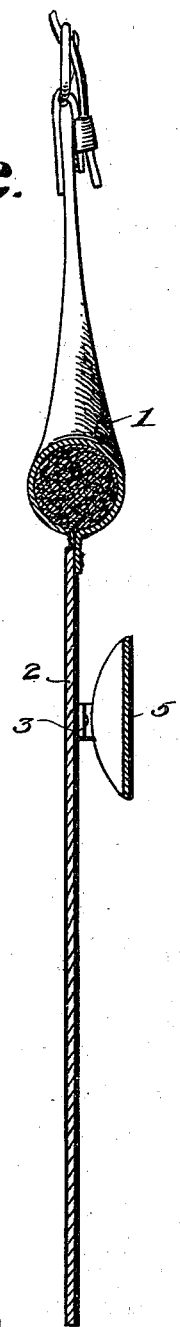
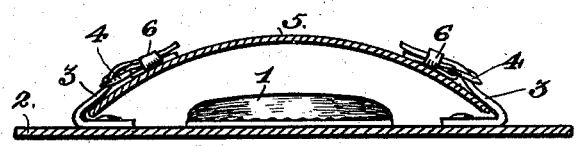
Witnesses
W. P. Burke, Inventor
by C. A. Snow & Co.
Attorneys

UNITED STATES PATENT OFFICE.

WASHINGTON P. BURKE, OF QUITMAN, GEORGIA.

CRUPPER-SHIELD.

SPECIFICATION forming part of Letters Patent No. 723,136, dated March 17, 1903.

Application filed March 28, 1901. Serial No. 53,315. (No model.)

*To all whom it may concern:*

Be it known that I, WASHINGTON P. BURKE, a citizen of the United States, residing at Quitman, in the county of Brooks and State of Georgia, have invented a new and useful Crupper-Shield, of which the following is a specification.

This invention relates to crupper-shields or devices for covering the rear portion of the body of a horse or other like animal to prevent exposure of expelled excrement or other matter to the occupants of a vehicle; and the object of the present improvement is to provide simple and effective means in connection with such device whereby it may be raised simultaneously with the elevation of the tail of the animal and fully clear the rear portion of the animal over which it normally depends in close relation.

The invention consists in the construction and arrangement of the several parts which will be more fully hereinafter described and claimed.

In the drawings, Figure 1 is a perspective view of the rear portion of a horse, showing the improved device applied in operative position. Fig. 2 is a longitudinal vertical section of the improved device. Fig. 3 is a transverse vertical section of the same.

Similar numerals of reference are employed to indicate corresponding parts in the several views.

The numeral 1 designates a crupper which is of the usual form and attached in the ordinary manner, and to the center of the enlarged portion thereof at the rear an elongated shield or apron 2 is permanently secured, said shield or apron being preferably composed of leather. While it is preferred that the shield or apron be permanently secured to the crupper, it is obvious that it could be made detachable in various well-known ways, and such construction, in view of the previous art, would not in the least constitute a departure from the present improvement. The shield or apron is extended laterally below its point of attachment to the crupper, and it is made particularly long, so as to fully cover the rear portion of the body of a horse or other animal and also to depend far enough below the plane of view of occupants of a vehicle over the dash as to completely hide all expelled excrement or urine and also to cover the parts of the anatomy intimately related to such deposits and from which the latter are expelled. The tail of the animal is also prevented by the elongation of the shield or apron from becoming soiled.

One of the special features resides in an attachment for connecting the shield or apron to the tail of the animal, whereby when the latter is raised said shield or apron will be simultaneously raised and be prevented from becoming soiled. At a considerable elevation above the lower end of the shield or apron attaching-straps 3 are secured near the side edges of the same, and have their loose portions extended inwardly in transverse alinement for adjustable and removable engagement with buckles 4, secured at opposite ends of a holder 5, consisting of a band of leather or the like and having considerable width to provide an extended bearing over the tail of the animal to which it is applied, as shown. The holder also has loops 6 adjacent to the buckles 4 for securing the ends of the straps 3 and prevent the latter from curling or presenting an unsightly appearance, and also to hold the said straps in connected relation to the buckles. The holder 5 is located well up on the tail, so as to be positively affected by the stub of the latter and also to allow free use of the tail. The holder can be easily applied over or released from the tail by detaching or disconnecting either one end or the other, and in place of the buckles 4 and straps 3 any other equivalent fastening means may be employed.

My invention, as will be seen from the foregoing description, has several important features which should not be lost sight of. One of these features consists in attaching the shield or apron to the crupper at the extreme point of the latter, where the sides of the strap constituting the crupper may be said to converge. This mode of attachment permits the shield to be freely raised or lowered by the movement of the tail of the animal, with which the shield is preferably connected, as before described; but lateral movement to any considerable extent which would defeat the purposes of the invention is rendered impossible. At the same time, being freely movable up and down with the tail of the animal, the shield is prevented from being soiled or moistened, whereby its usefulness would soon become impaired. Again, it will be observed that the sides of the shield are extended beyond what may be termed the "normal" width of the tail, thus making the said shield of ample width to perform the functions assigned to it in the foregoing specification.

Having thus described the invention, what is claimed as new is—

The combination with a crupper, of a leather shield connected flexibly with the point of said crupper below the broadest part of the latter, so as to be capable of moving freely up and down, but not laterally, said shield having lateral extensions below its point of attachment to the crupper, said extensions projecting beyond the normal width of the tail of the animal, and means for confining the tail in contact with the shield at a distance from the edges of the lateral projections.

In testimony that I claim the foregoing as my own I have hereto affixed my signature in the presence of two witnesses.

WASHINGTON P. BURKE.

Witnesses:
B. L. HUMPHREY,
D. J. MOORE.